G. B. SOUTHARD.
PLANTING POT.
APPLICATION FILED APR. 21, 1915.
1,200,396.
Patented Oct. 3, 1916.
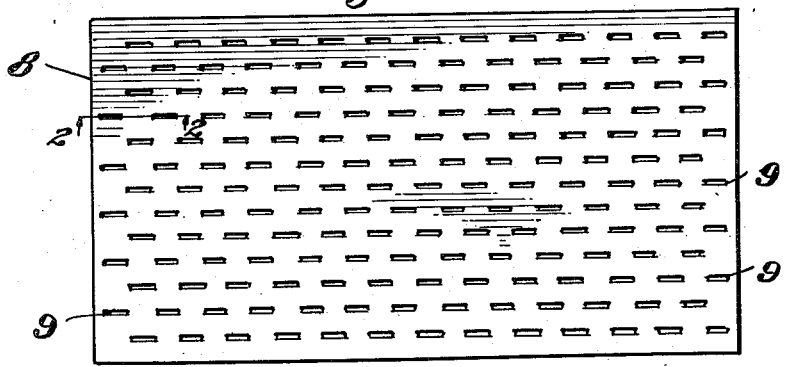
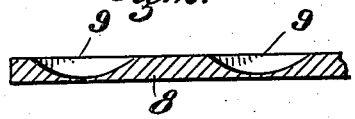
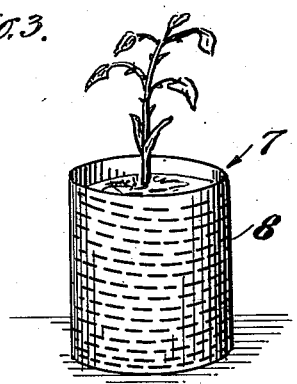
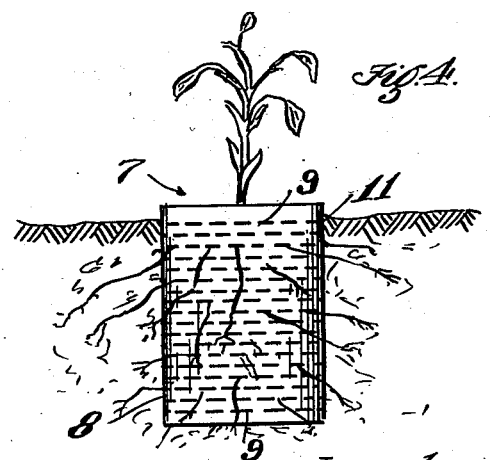
Inventor.
George B. Southard.

UNITED STATES PATENT OFFICE.

GEORGE B. SOUTHARD, OF REDLANDS, CALIFORNIA, ASSIGNOR OF ONE-FOURTH TO NETTIE N. CHILDS AND ONE-FOURTH TO THERESA A. NYE, OF LOS ANGELES, CALIFORNIA.

PLANTING-POT.

1,200,396.   Specification of Letters Patent.   Patented Oct. 3, 1916.

Application filed April 21, 1915. Serial No. 22,814.

*To all whom it may concern:*

Be it known that I, GEORGE B. SOUTHARD, a citizen of the United States, residing at Redlands, in the county of San Bernardino and State of California, have invented new and useful Improvements in Planting-Pots, of which the following is a specification.

This invention relates to a planting pot construction and the object of the invention is to provide a receptacle in which soil may be placed and seeds planted in said soil and allowed to germinate and sprout, or whereby cuttings may be placed therein and allowed to sprout, after which the plant may be transplanted by placing the receptacle in the earth without removing the plant therefrom.

It has been the common practice to germinate seeds and start cuttings by placing soil in earthenware pots, and the seeds or cuttings in the soil. When the plant has matured sufficiently it is removed by lifting it with the soil from the pot. This causes a disturbance of the soil and the roots, and also frequently injures the latter. Pot constructions have been made which consist of a pot formed of flexible material, one wall thereof having a slit whereby the wall may be opened and unrolled from the plant, thus only slightly disturbing the soil and decreasing any possible injury to the root. The soil in many cases is of such a nature that it will not cling to the roots when removed from the pot, and falls away, exposing the roots so that they are subject to injury and resulting in arresting the growth of the plant when it is transplanted from the pot to the soil. In many cases delicate plants are killed during the transplanting. Growing plants throw out shoots which seek nourishment, and when a pot containing a plant is placed in the ground, the roots will tend to pass through the walls of the pot to the outside soil, while if the pot is not placed in the soil, the roots do not tend to pass through.

My invention relates to a pot which is constructed of a material such as paper which will disintegrate, and which has formed in the walls thereof recesses so that the roots of the plant when the pot is placed in the ground will work through the walls of the pot with substantially no resistance, and will enter the surrounding soil, taking root therein. The growth of the plant while in the pot is not retarded, the incisions or recesses providing means through which air can enter, thereby aerating the soil and preventing sumpy soil, which often results in sick plants. I attain these objects by the embodiments of my invention illustrated in the accompanying drawing, in which:

Figure 1 is a development of the cylindrical wall of a pot having recesses therein. Fig. 2 is a section taken on the line 2—2 of Fig. 1. Fig. 3 is a perspective view showing a plant in a pot, ready for transplanting to the ground. Fig. 4 is an elevation of the pot and plant transplanted to the ground, with the roots extending through the walls.

I have shown a pot 7 of cylindrical form, although the shape of the pot is not a feature of my invention. The cylindrical wall 8 is formed of a material such as paper which will eventually disintegrate when placed in the ground.

Referring particularly to Figs. 1 and 2, the cylindrical wall 8 has recesses 9 provided in its surface, thereby providing a portion of the wall with relatively weak parts, through which the plant roots will penetrate soon after the pot is placed in the ground. When planted in the ground the thin weak portions of the wall at the recesses 9 will disintegrate first and will before disintegration offer less resistance to the passage of roots than the thicker portions of the wall. With such a pot construction the soil may be placed in the pot, the seed placed therein and allowed to germinate, or cuttings may also be placed in the pot and allowed to sprout, the roots confining themselves to the pot. After the plant has matured so that it may be transplanted to the soil, a hole 11 is dug and the pot with the plant transferred thereto. The soil is then packed around the pot. As the plant grows, the roots seek the nourishment of the soil outside of the pot, and work through the weakened portions of the wall, formed by the recesses, and extend outward. The pot eventually disintegrates and in no way interferes with the growth of the plant. It is obvious that this method of transplanting has the advantage of providing a relatively rigid receptacle for containing the soil and roots during the early growth of the plant, and that upon transplanting, there is no disturbance of the roots or soil and no interference with or arrest of growth of the plant.

What I claim is:

A planting pot, comprising a pot formed with walls of material which will disintegrate on being transferred to the ground, and having recesses formed therein, thereby providing weakened portions which will permit the penetration of roots of plants placed therein before disintegration of the walls.

In witness that I claim the foregoing I have hereunto subscribed my name this 26th day of March, 1915.

GEORGE B. SOUTHARD.